Feb. 27, 1951 W. C. DAVIS 2,543,278
SAWMILL DRIVE
Filed Aug. 26, 1948 2 Sheets-Sheet 1
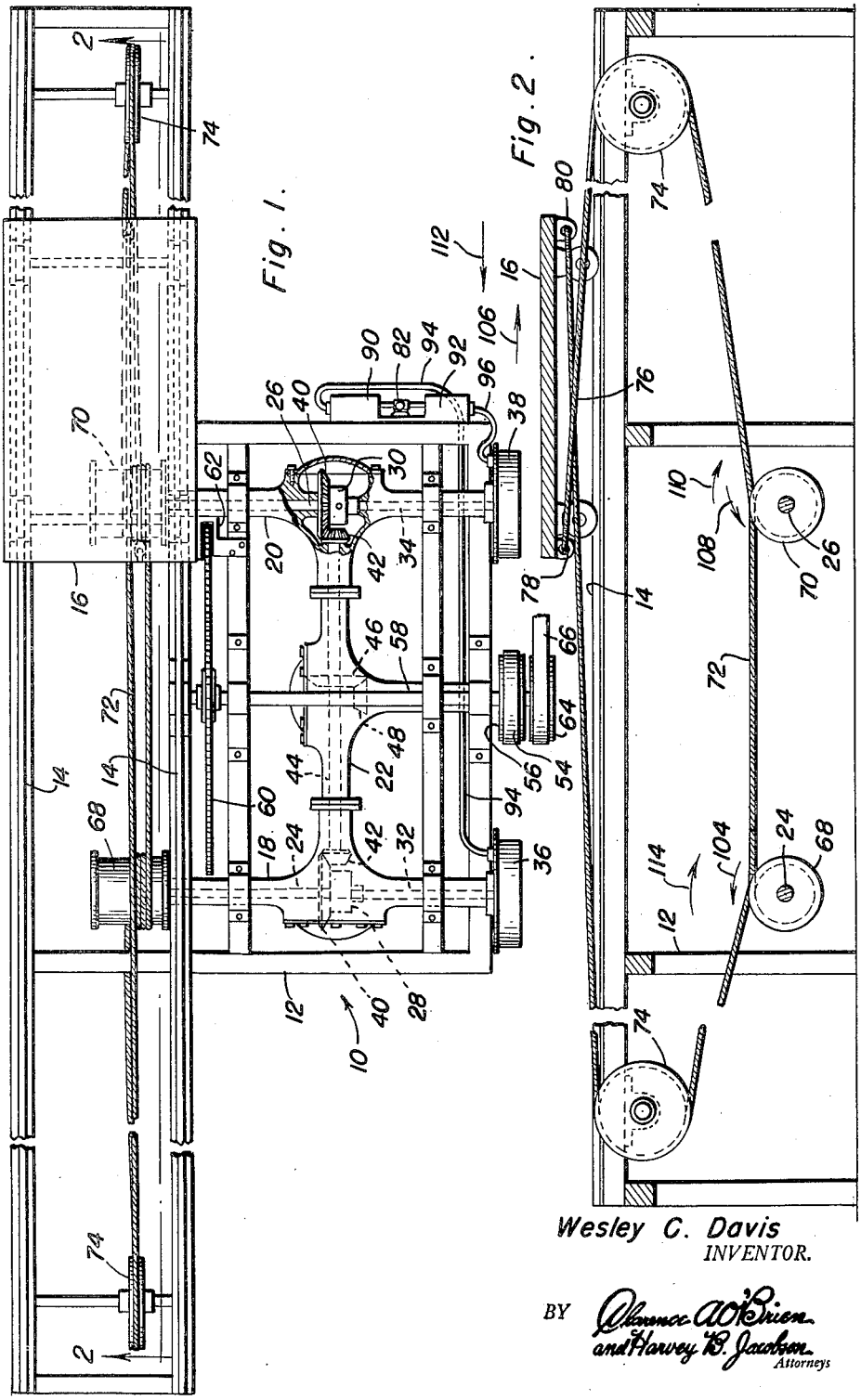
Wesley C. Davis
INVENTOR.
BY Clarence A. O'Brien
and Harvey B. Jacobson
Attorneys

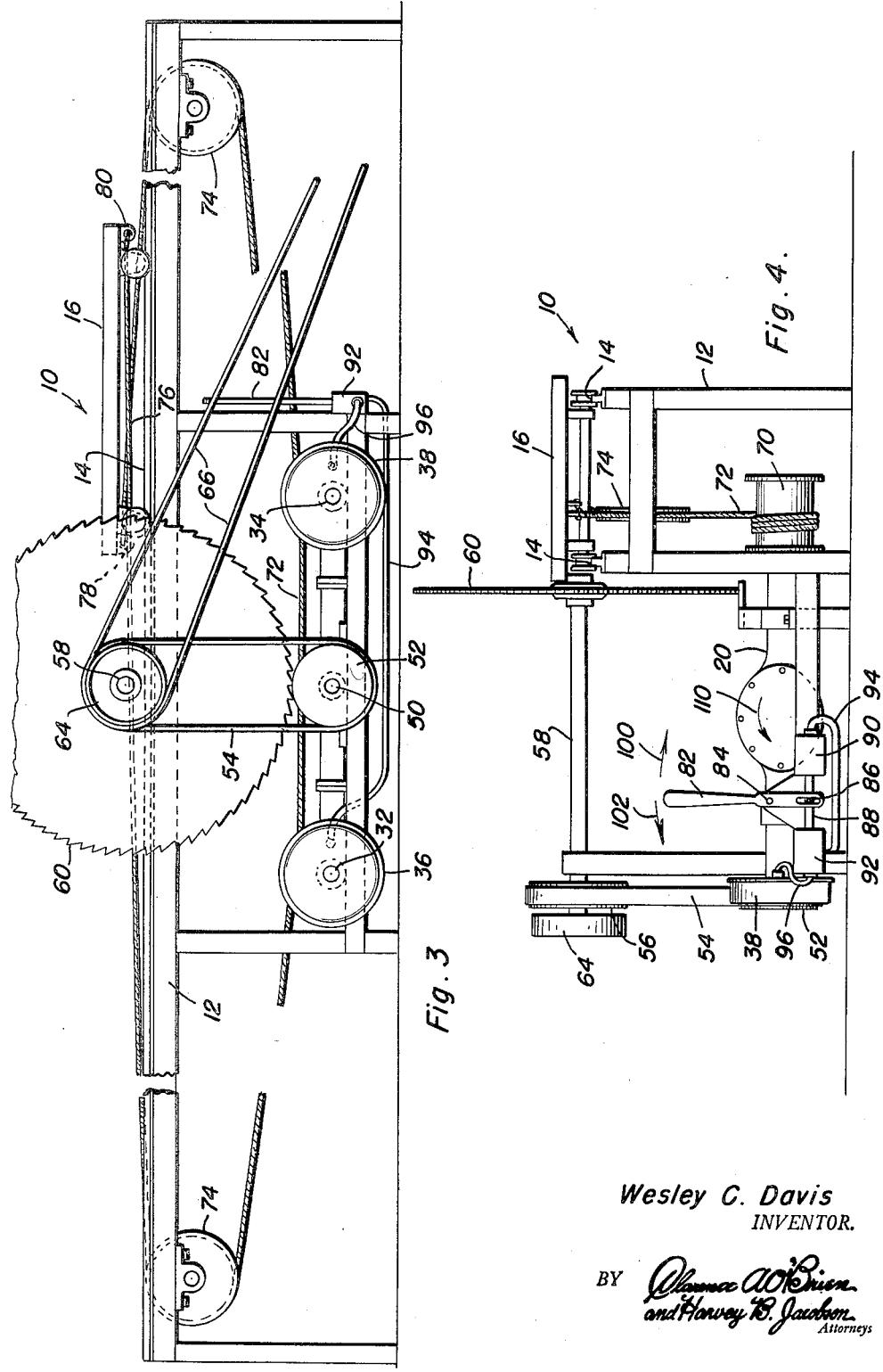

Patented Feb. 27, 1951

2,543,278

UNITED STATES PATENT OFFICE 2,543,278

SAWMILL DRIVE

Wesley C. Davis, Iron Mountain, Mich.

Application August 26, 1948, Serial No. 46,233

4 Claims. (Cl. 74—27)

This invention relates to new and useful improvements and structural refinements in saw mills, and the principal object of the invention is to provide highly efficient means for reciprocating the usual saw mill carriage.

This object is achieved by employing discarded automobile rear axle assemblies, complete with brakes, these being structurally arranged in such manner as to impart reciprocating movement to the saw mill carriage by a simple actuation of the brake mechanism on one of the axles or another.

It will be apparent from the foregoing that the carriage reciprocating structure, being made from otherwise useless material, may be economically assembled even by persons of limited mechanical skill.

Other advantages of the invention reside in its simplicity of construction and convenience of manipulation.

With the above more important objects and features in view, and such other objects and features as may become apparent as this specification proceeds, the invention consists essentially of the arrangement and construction of parts as illustrated in the accompanying drawings, in which:

Figure 1 is a top plan view of the invention;

Figure 2 is a cross sectional view, taken substantially on the plane of the line 2—2 in Figure 1;

Figure 3 is a side elevational view of the invention, and

Figure 4 is an end view of the same.

Like characters of reference are employed to designate like parts in the specification and throughout the several views.

Referring now to the accompanying drawings in detail, the invention consists of a saw mill designated generally by the reference character 10, the same embodying in its construction a framework 12 which, in plan view, is of a substantially T-shaped configuration (see Figure 1) and includes a track 14 on which a wheeled carriage 16 is reciprocable.

A pair of discarded automobile rear axle assemblies 18, 20 are mounted upon the framework 12 in spaced parallel relation, while a further rear axle assembly 22 extends transversely between the assemblies 18, 20, as is best shown in Figure 1. It is to be noted that the rear axle assemblies 18, 20 include what will hereinafter be referred to as driven shafts 24, 26 respectively, these being operatively connected by differential gear units 28, 30 respectively to what will be hereinafter called brake shafts 32, 34, respectively, the latter being equipped with the usual, conventional hydraulic brake units 36 and 38.

The "crown" gears 40 of the differential gear units 28, 30 mesh with suitable pinions 42 secured to the ends of a shaft 44 which extends through the aforementioned axle unit 22 in substitution for the usual two axle shafts with which such rear axle unit is provided. An intermediate portion of the shaft 44 carries a further "crown" gear 46 meshing with a further pinion 48, the latter being secured to a shaft 50 rotatable on the framework 12 and carrying a pulley 52. This pulley is operatively connected by a belt drive 54 to a further pulley 56 which, in turn, is secured to a shaft 58 rotatable on the framework 12. It is to be noted that the shaft 58 carries a circular saw 60 disposed adjacent one side of the track 14, this saw being provided with a suitable guard 62, shown in Figure 1. The shaft 58 also carries a further pulley 64 operatively connected by a belt 66 to a source of motive power of the saw mill as a whole.

The aforementioned driven shafts 24, 26 carry suitable drums 68, 70 respectively, disposed under the track 14, and a continuous length of cable 72 is wound successively around the drums and also passes around a pair of pulleys 74 rotatably mounted adjacent the ends of the track, as is best shown in Figures 1, 2 and 3.

The end portions of the cable 72 are crossed as at 76 and are attached to the remote ends of the carriage 16 by suitable eyes 78 and 80. As will be readily apparent, this arrangement facilitates a maximum reciprocating travel of the carriage, but permits the pulleys 74 at the ends of the track 14 to be spaced as closely as possible.

The aforementioned hydraulic brake units 36, 38 are selectively and independently controlled by means of an actuating lever 82 pivoted to the framework 12 as at 84 (see Figure 4) and adapted as at 86 to impart reciprocating movement to a common plunger rod 88 of a pair of opposed hydraulic "master" cylinders 90, 92 secured to the framework. It will be noted that the cylinders 90, 92 are connected by hydraulic lines 94, 96 respectively to the respective hydraulic brake units 36, 38, as is best shown in Figure 1. Accordingly, by moving the lever 82 in the direction of the arrow 100 (see Figure 4), the brake 36 will be applied, and similarly, by moving the lever in the direction of the arrow 102, the brake 38 will be applied, as will be clearly understood.

When the invention is placed in use, the trees to be sawed are, of course, placed upon the carriage 16 and the latter is reciprocated toward and from the saw 60, so that boards of predetermined thickness may be cut successively from the tree.

This procedure is, of course, of the conventional nature, the invention concerning itself primarily with the structure and function of the particular means employed for reciprocating the carriage 16. The operation of this means will now be described.

Assuming the shaft 58 to be driven and further assuming the brake actuating lever 82 to be in its central, neutral position so that the brakes 36, 38 are not applied, rotation of the shaft 58 will be transmitted by the belt 54 to the shaft 50 and hence, through the gears 48, 46 to the shaft 44. The latter shaft, in turn, will rotate the differential gear units 28, 30, which will tend to rotate the driven shafts 24, 26 in relatively opposite directions. However, since the cable 72 passing around the drums 68, 70 will prevent the shafts 24, 26 from rotating in opposite directions, these shafts will remain stationary and the drive will be expended through the differential gear units 28, 30, resulting in the rotation of the brake shafts 32, 34 in opposite directions and without restriction by the brakes 36, 38.

However, if the brake actuating lever 82 is moved in the direction of the arrow 100 (see Figure 4) the brake 36 will be applied, thus causing the shaft 32 to remain stationary while the associated driven shaft 24 will rotate, for example in the direction of the arrow 104 (see Figure 2) by virtue of the differential gear unit 28. This rotation of the shaft 24 will, of course, be transmitted by the cable 72 to produce a movement of the carriage 16 in the direction of the arrow 106 (see Figure 2, thus causing the remaining drum 70 and the associated shaft 26 to rotate as shown at 108. The foregoing movements are, of course, based on the assumption that the shaft 44 is rotated by the motive power in the direction of the arrow 110 in Figure 4, which rotation of the shaft 44 would, of course, normally tend to rotate the shaft 26 in a direction opposite to that indicated by the arrow 108 in Figure 2. However, with the brake 38 still "off" and with the drive in the direction of the arrow 104 imparted to the shaft 24 being stronger than the tendency of the shaft 26 to rotate in a direction opposite to that shown by the arrow 108, the shaft 26 will rotate as shown by the arrow 108 with the result that the associated brake shaft 34 will turn at a greater speed and without restriction by the brake 38.

A similar situation exists when the brake actuating lever 82 is moved in the direction of the arrow 102 (see Figure 4) on which occasion the brake 38 prevents rotation of the shaft 34 and the associated shaft 26 is driven in the direction of the arrow 110, resulting in the movement of the carriage 16 as indicated at 112. (See Figure 4.) In this event, the drum 68 and the associated shaft 24 will rotate in the direction of the arrow 114 (by virtue of the cable 72) and the brake shaft 32 will rotate at an increased speed, without restriction by the brake 36.

It will be apparent from the foregoing that by simply actuating the lever 82 so as to selectively energize the cylinders 90, 92, the carriage 16 may be caused to travel in one direction or the other, thus carrying out the reciprocating movement necessary for the cutting of a tree, or the like, into boards by the circular saw 60.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a saw mill, a reciprocable carriage, a pair of driven shafts, a flexible element operatively connected to said driven shafts and to said carriage, a pair of brake shafts, a pair of differential gear units each operatively connecting one of said brake shafts to one of said driven shafts, a pair of brake units each provided on one of said brake shafts, and means for simultaneously driving said differential gear units whereby said driven shafts may be selectively and independently rotated upon application of one of said brake units.

2. In a saw mill, a reciprocable carriage, a pair of driven shafts, drums on said driven shafts, a cable engaging said drums and connected to said carriage, a pair of brake shafts, a pair of differential gear units each operatively connecting one of said brake shafts to one of said driven shafts, a pair of brake units each provided on one of said brake shafts, and a driving axle operatively connecting together said differential gear units for simultaneous rotation whereby said driven shafts may be selectively rotated in either direction upon application of one of said brake units.

3. The device as defined in claim 2 together with means for selectively and independently applying said brake units.

4. The device as defined in claim 3 wherein said cable is wound successively around said drums, the ends of said cable being attached to said carriage.

WESLEY C. DAVIS.

No references cited.